United States Patent [19]
Nilsson

[11] Patent Number: 5,569,378
[45] Date of Patent: Oct. 29, 1996

[54] COLLECTION AND SEPARATION APPARATUS

[75] Inventor: Majvor Nilsson, Ekerö, Sweden

[73] Assignee: MKH-Konsult, Ekero, Sweden

[21] Appl. No.: 360,741

[22] Filed: Feb. 8, 1995

[30] Foreign Application Priority Data

Jun. 23, 1992 [SE] Sweden ............................. 9201933

[51] Int. Cl.$^6$ ..................................................... E02B 15/04
[52] U.S. Cl. ............................. 210/242.1; 210/242.3; 210/923
[58] Field of Search ................... 210/242.1, 242.3, 210/776, 923

[56] References Cited

U.S. PATENT DOCUMENTS

| | | | |
|---|---|---|---|
| 3,576,257 | 4/1971 | Yates | 210/242.3 |
| 3,865,730 | 2/1975 | Ayers et al. | 210/242 |
| 4,085,049 | 4/1978 | Harturich et al. | 210/242.3 |
| 4,322,294 | 3/1982 | Price | 210/242.3 |
| 4,978,448 | 12/1990 | Terokomos | 210/242.3 |
| 5,043,064 | 8/1991 | Abell et al. | 210/242.1 |

FOREIGN PATENT DOCUMENTS

| | | | |
|---|---|---|---|
| 3148613 | 7/1983 | Germany | E02B 15/10 |
| 3205007 | 8/1983 | Germany | E02B 15/04 |
| 434533 | 7/1984 | Sweden | E02B 15/04 |

Primary Examiner—Christopher Upton
Attorney, Agent, or Firm—Cushman Darby & Cushman, L.L.P.

[57] ABSTRACT

This invention relates to a collection and separation apparatus for removing oil and the like from a water surface, the apparatus being provided with two gables, which are stationarily arranged on a shaft, which is rotably arranged in a frame and intended to be driven by a driving motor. The apparatus comprises a trough, which is open upwards and intended to cooperate with a helical means for removing of oil collected in the trough. According to the invention the apparatus comprises at least two shovel-formed collection means, which are arranged between the gables and fastened to these ones. In this connection a first collection means comprises a square-formed or rectangular-formed net or filter cloth, whereas a second collection means comprises a plurality of means, which are like jalousie ribs, and which are positioned one after the other along an imaginary, arched connection line.

5 Claims, 2 Drawing Sheets

COLLECTION AND SEPARATION APPARATUS

BACKGROUND OF THE INVENTION

This invention relates to a collection and separation apparatus for removing oil and the like, from a water surface, or particles floating freely in a water phase, which apparatus is provided with two gables which are stationarily arranged at a distance from each other on a shaft which is rotatably arranged in a frame and intended to be driven by a first driving motor, the apparatus comprising an elongated trough, open upwards, which is stationarily arranged in the frame and has a form which is horizontally arranged, hollow, circular cylindrical with a portion of a jacket surface, which is directed upwards, cut away, and a helical means, which is driven by the first driving motor or by a second driving motor, being arranged in the trough, for removal of collected oil.

A similar apparatus is previously known from Swedish patent 8300189-1. According to this patent specification, the known apparatus comprises one single means in the form of a net for collection of oil. This means that the known apparatus can only be utilized for oil exceeding a certain threshold value of thickness, which is determined by the size of the meshes of the net. Of course, this means a clear limitation of the usefulness of the known apparatus.

SUMMARY OF THE INVENTION

This invention intends to remove this problem and offer an apparatus which makes possible a very effective collection of oils/liquids of different viscosity lying on a water surface. This has been made possible by an apparatus of the kind mentioned by way of introduction which is characterized by the combination of the following features:

- the apparatus at least comprises two shovel-formed collection means which are arranged between the gables and fastened to the gables;
- the first collection means comprises a square-formed or a rectangular-formed net or filter cloth which has a curved design and has an inner and an outer edge which are substantially parallel with the longitudinal axis of the trough, the inner edge of the net/filter cloth being intended to stroke against the jacket surface of the trough, whereas the outer edge of the net/the cloth projects outside the trough a substantial distance, for achieving a large sweeping area;
- the second collection means comprises a plurality of means, which are like jalousie ribs, and which are positioned one after the other along an imaginary, arched connection line, the second collection means comprising an inner edge which is intended to stroke against the jacket surface of the trough; and
- the collection means have a balanced position in the apparatus which means when two collection means are arranged that these collection means are positioned substantially opposite each other on each side of the trough, i.e. they are angularly displaced about 180° in relation to each other.

BRIEF DESCRIPTION OF THE DRAWINGS

A preferred embodiment of the invention shall be described more closely with reference to the accompanying drawings, in which.

DETAILED DESCRIPTION

Figure 1:
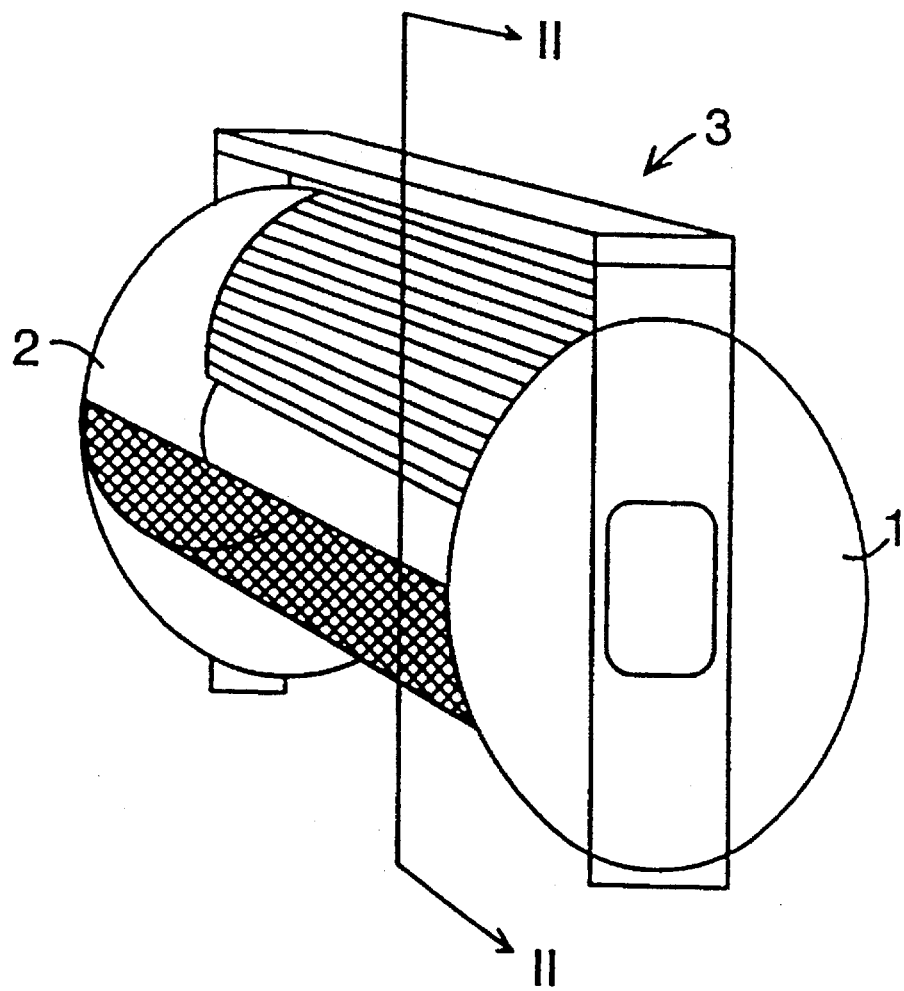
FIG. 1 shows a perspective view of the apparatus.
Figure 2:
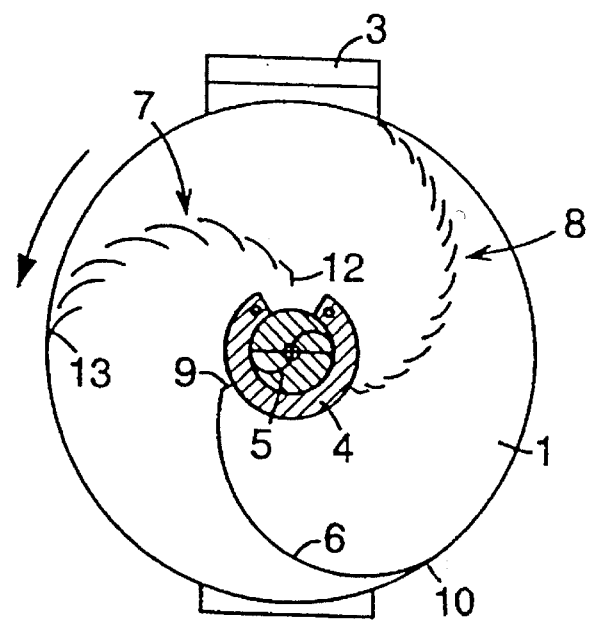
FIG. 2 shows a section of the apparatus, taken along the line II—II of FIG. 1.

Referring to FIGS. 1, 2, the new apparatus comprises a horizontally arranged rotor having two gables or end flanges 1, 2 which preferably are circular and are arranged at a fixed distance from each other on a shaft (not shown) which is rotatably arranged in a frame 3. The shaft and the gables 1, 2 are intended to be driven by first driving motor C (not shown). In a central position, there is a trough, open upwards and positioned between the gables 1, 2, which trough is stationarily arranged in the frame 3 and has a form which is like a horizontally arranged hollow, circular-cylinder, with a portion of a jacket surface, which is directed upwards, cut away. A helical means 5 which is intended to be driven by a second driving motor is arranged in the trough 4 for removal of collected oil.

According to the invention the apparatus comprises at least two shovel-shaped collection means, but preferably three shovel-shaped collection means 6–8, as is shown in the drawing, or more. These collection means are arranged between the gables and fastened to the gables. One collection means 6 comprises a square or rectangular, perforated net, which is suitably made of so called expanded metal, whereby the net is provided with meshes of a certain size. Instead of a net, the collection means 6 may comprise a filter cloth, the filtration ability of which can be of varying degree. It is also possible to have an embodiment comprising a combination of perforated net and filter cloth. Each net and filter cloth combination has an inner edge 9 and an outer edge 10 which are substantially parallel with the longitudinal axis of the trough 4. In this connection the inner edge 9 of the net filter cloth is intended to stroke against the jacket surface of the trough 4, whereas the outer edge 10 of the net filter the cloth projects outside the trough a good distance for achieving a large sweeping area. Preferably the outer edge 10 of the net, filter the cloth reaches out substantially as far as or farther than the peripheral areas of the circular gables 1, 2. Each net filter cloth has a curved design, the curve being made in the rotational direction of the net filter cloth. Due to that fact each collection means functions as a ladle which brings the water mixed with oil/particles towards the trough at the center of the apparatus.

Each one of the two shovel-shaped collection means 7, 8 comprises a large number of means 11, which are like jalousie ribs and which are positioned one after the other, i.e. in a series extending along an imaginary, arched line. In this connection, the number of means is preferably at least eight in each collection means 7, 8. The means 11 have a convex outer periphery and a concave inner periphery. This design results in that the convex part of the means 11 pushes away the water when the collection means 7, 8 break through the water surface, whereas the concave part of the means 11 surrounds the oil, which due to the density difference strives up through the water layer towards the water surface, due to that fact the oil is effectively forced in towards the center of the apparatus and gets into the trough 4.

The collection means 7, 8 in similarity to the means 6 comprise an inner edge 12 which is intended to stroke against the jacket surface of the trough 4 in order thereby to improve the feed of separated oil into the trough 4.

Furthermore, the collection means 7, 8 have an outer edge 13 which is positioned at substantially the same peripheral distance from the center of the apparatus as the outer edge 10 of the collection means 6.

The means 11, which are like jalousie ribs, of each shovel-shaped collection means 7, 8 are disposed in line along the width of the entire apparatus from gable 1 to gable 2, and overlap each other. This has the consequence that enclosed oil can not leak out but is all the time due to the design of the shovels forced in towards the trough 4 in the center of the apparatus. Due to the fact that the means 11, which are like jalousie ribs, overlap each other, an increased capacity of the ability of oil collection and a better enclosure of the oil during its movement towards the center of the apparatus are achieved. The angle of the means 11 in relation to an imaginary, arched connection line for the means 11 in each collection means 7, 8 can be varied between 0° and 45°. Due to that fact the possibility to separate media with different viscosity is improved.

The collection means 6–8 have such a position in relation to each other that a balance arises in the collection apparatus. This means that when there are two collection means these collection means are angularly displaced in relation to each other by about 180°. When there are three collection means, as is shown in the preferred embodiment, the angular displacement between the neighboring means is about 120°.

The great advantage by having a plurality of collection means in the clearing apparatus is partly that it becomes more effective, and partly that each collection means 6–8 can have an optimum design, whereby one and the same clearing apparatus can be used for taking up oils/liquids of different viscosity.

Figure 3:
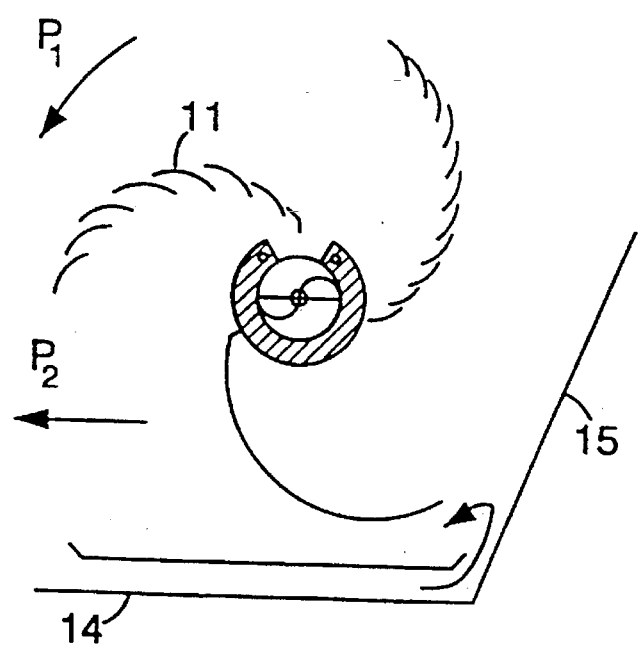
FIG. 3 shows a schematic illustration of the way of action of the apparatus.

In FIG. 3, the collection apparatus has been provided with a bottom plate 14 and a plate-shaped back part 15. Due to that fact also polluting material being further down in the water can be led in towards the shovels for a further separation from the water.

The collection means 6–8 are intended to rotate in the direction of the arrow $P_1$ at the same time as the apparatus moves forwards in the direction of the arrow $P_2$. The rotation of the shovels 6–8 with a movement going downwards, the shovels or combined nets and filter cloths sweeping through the water mixed with oil, creates a surface stream in towards the center of the apparatus. This surface stream attracts the oil floating-freely, due to the inherent adhesion forces of the oil. Due to that fact there will be a very effective separation of oil from the water and this oil falls down into the trough 4, from which it is taken away by the helical means 5 arranged in the trough.

Modifications of the invention are of course possible within the scope of the following claims. Thus, an arrangement is possible where one and the same driving motor drives the shaft, on which the gables 1, 2 are fastened, and the helical means 5 for taking away the oil.

I claim:

1. A collection and separation apparatus for removing oil floating on a water surface, comprising:

a frame having a horizontally arranged, upwardly opening trough having a generally cylindrically curved outer peripheral surface;

a helical member disposed in the trough and arranged to be rotated for conveying axially in the trough, oil which has collected in the trough from above the trough;

a horizontally arranged rotor journalled in the frame for rotation about a horizontal longitudinal axis of the rotor;

the trough being radially peripherally surrounded by the rotor;

the rotor including two axially spaced end flanges and at least two shovels extending between and fastened to said end flanges and having equiangular spacing from one to another around said rotor;

each said shovel being concave towards a direction of rotation of said rotor about said axis of said rotor;

each said shovel having an inner edge arranged to sweep in contact with said outer peripheral surface of said trough, and an outer edge located radially distally of said trough;

at least one of said shovels being made of a rectangular piece of material made of at least one of perforated metal and filter cloth; and at least another of said shovels being made of a radially and angularly extending series of radially spaced longitudinal ribs.

2. The apparatus of claim 1, wherein:

there is a total of two said shovels, spaced 180° apart.

3. The apparatus of claim 1, wherein:

there is a total of three said shovels, spaced 120° apart, and including two of said other shovels.

4. The apparatus of claim 1, wherein:

on each said other shovel, each said rib is concavely curved rotationally forwards and convexly curved rotationally rearwards with respect to said direction of rotation of said rotor.

5. The apparatus of claim 1, wherein:

said ribs of each said other shovel are arranged for angular adjustment through up to 45° for varying angular disposition of the ribs relative to one another, and thereby of rib-to-rib spacing between said ribs.

\* \* \* \* \*

UNITED STATES PATENT AND TRADEMARK OFFICE
CERTIFICATE OF CORRECTION

PATENT NO.   : 5,569,378

DATED        : October 29, 1996

INVENTOR(S)  : NILSSON

It is certified that error appears in the above-identified patent and that said Letters Patent is hereby corrected as shown below:

On the title page:

add item [86], to include:
--PCT No.:  PCT/SE93/00355--;
--§ 371 Date:  February 8, 1995--;
--§ 102(e) Date:  February 8, 1995--; and add item [87], to include:
--PCT Pub. No.:  WO94/00642--;
--PCT Pub. Date:  January 6, 1994--.

Correct the assignee's name to:
--Swedish Roto Trading, Nordmaling, Sweden--.

Signed and Sealed this

Sixth Day of May, 1997

*Attest:*

*Attesting Officer*

BRUCE LEHMAN
*Commissioner of Patents and Trademarks*